(12) United States Patent
Roth

(10) Patent No.: US 6,572,057 B1
(45) Date of Patent: Jun. 3, 2003

(54) HANGER SYSTEM FOR CONDUITS AND CHANNEL MEMBERS

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 0 days.

(21) Appl. No.: 09/769,904

(22) Filed: Jan. 25, 2001

(51) Int. Cl.$^7$ .................................................. F16L 3/00
(52) U.S. Cl. ....................... 248/58; 248/62; 248/217.2; 248/227.1
(58) Field of Search .............................. 248/60, 62, 58, 248/65, 217.2, 227.1, 228.2, 228.1, 228.4; 285/61, 64; 24/20 R; 191/40

(56) References Cited

U.S. PATENT DOCUMENTS

| | | | | |
|---|---|---|---|---|
| 2,273,571 A | * | 2/1942 | Hafemeister | 248/62 |
| 2,375,513 A | * | 5/1945 | Bach | 248/59 |
| 2,676,680 A | * | 4/1954 | Kindorf | 238/342 |
| 2,933,567 A | * | 4/1960 | Mageoch | 191/40 |
| 2,990,458 A | * | 6/1961 | Mageoch | 191/40 |
| 3,053,355 A | * | 9/1962 | Attwood | 189/36 |
| 3,417,951 A | * | 12/1968 | Rebentisch, Jr. | 248/62 |
| 4,413,799 A | * | 11/1983 | Gabriel | 248/59 |
| 4,417,711 A | * | 11/1983 | Madej | 248/74.4 |
| 4,429,440 A | * | 2/1984 | Laughlin et al. | 24/486 |
| 4,479,625 A | * | 10/1984 | Martz | 248/62 |
| 4,516,296 A | * | 5/1985 | Sherman | 24/279 |
| 4,784,552 A | * | 11/1988 | Rebentisch | 411/85 |
| 5,344,108 A | * | 9/1994 | Heath | 248/300 |
| 5,564,659 A | * | 10/1996 | DeCapo | 248/72 |
| 5,855,342 A | * | 1/1999 | Hawkins et al. | 248/55 |
| 5,971,329 A | * | 10/1999 | Hickey | 248/316.7 |
| 6,126,122 A | * | 10/2000 | Ismert | 24/271 |
| 6,283,158 B1 | * | 9/2001 | Botsolas et al. | 138/110 |
| 6,305,650 B1 | * | 10/2001 | Hawkins et al. | 248/68.1 |

OTHER PUBLICATIONS

Page 16 of the Jul., 1996 edition of the Minerallac Company Product Guide.
Page 18 & 19 of the Jul., 1996 edition of the Minerallac Company Spring Steel Fasteners Catalog.
Pages 57–82 of the 1999 Erico, Inc. Caddy Fasteners Catalog.

* cited by examiner

*Primary Examiner*—Leslie A. Braun
*Assistant Examiner*—Ingrid Weinhold
(74) *Attorney, Agent, or Firm*—Thomas R. Lampe

(57) ABSTRACT

Hanger apparatus includes a, hanger member and spaced projections attached to a base of the hanger member. The hanger member can be oriented to allow for support by a hanger rod, in which position the projections engage a conduit, or oriented to support a channel member by the projections.

4 Claims, 10 Drawing Sheets

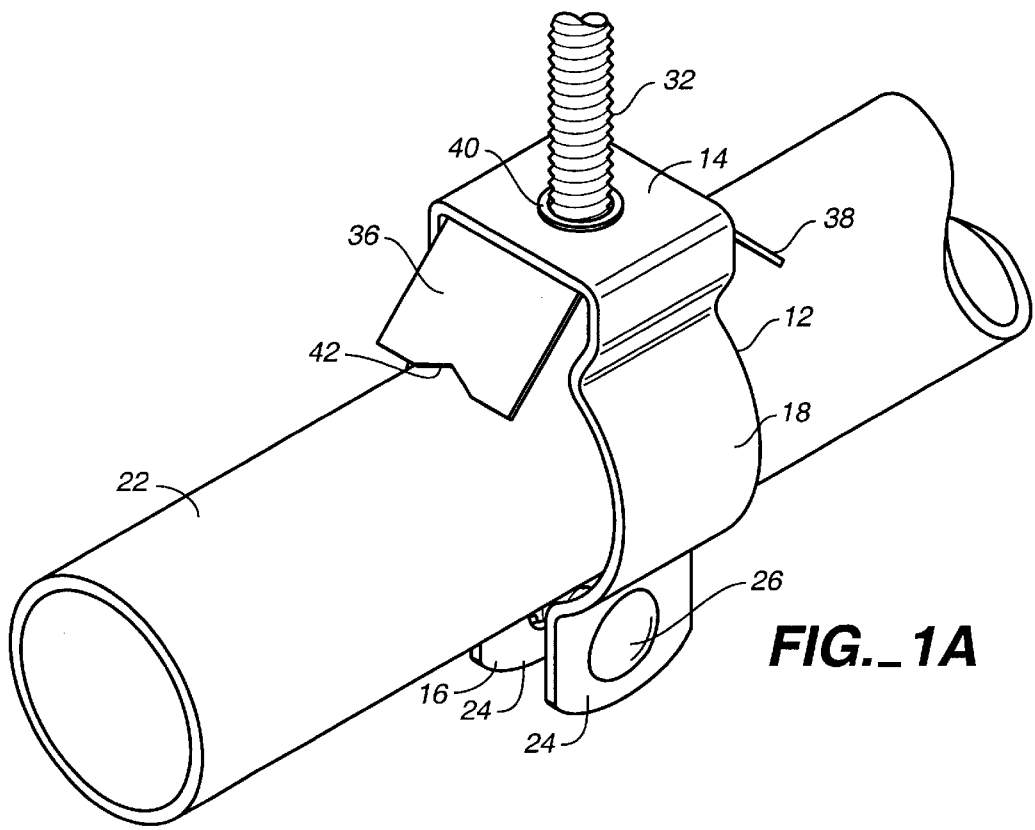
FIG._1A
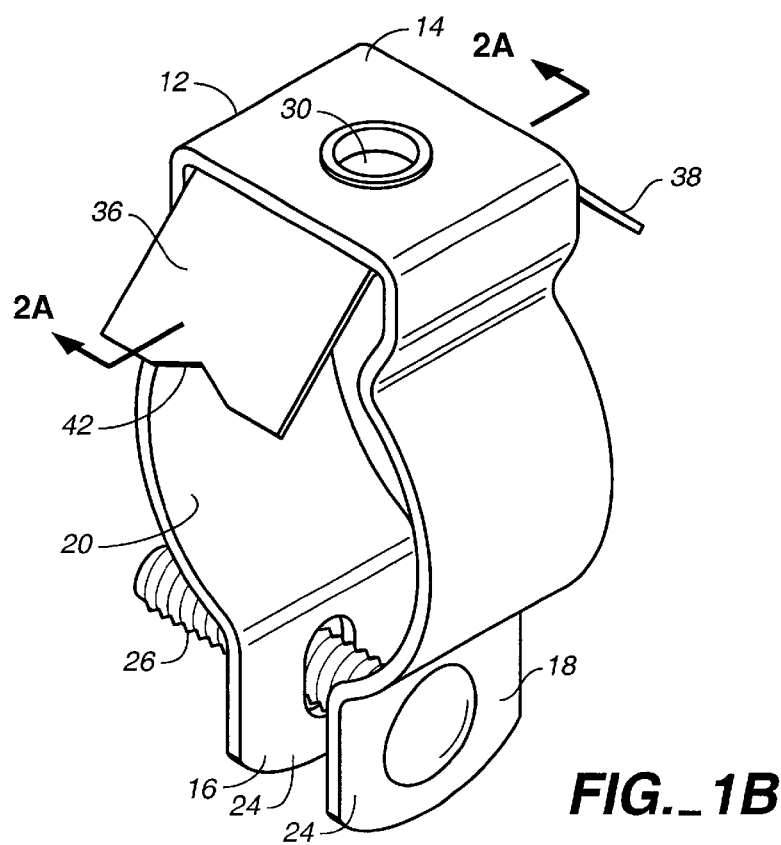
FIG._1B

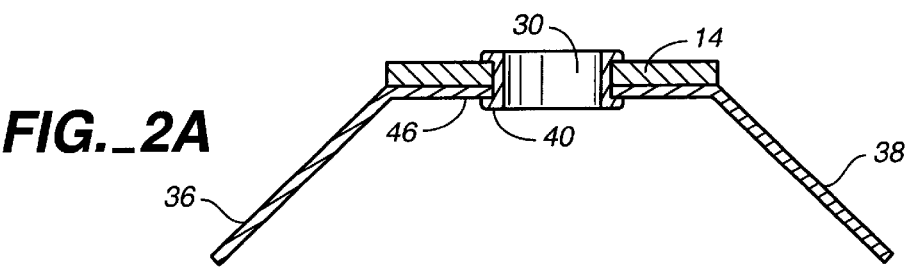
FIG._2A
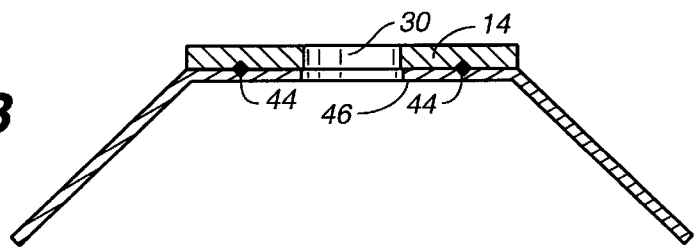
FIG._2B
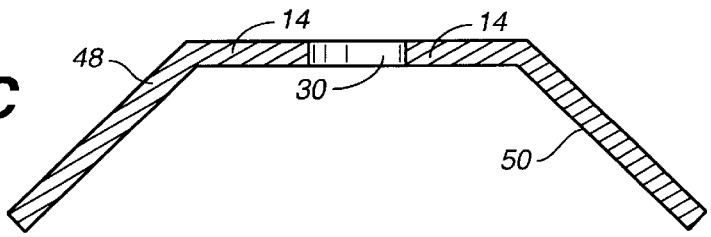
FIG._2C
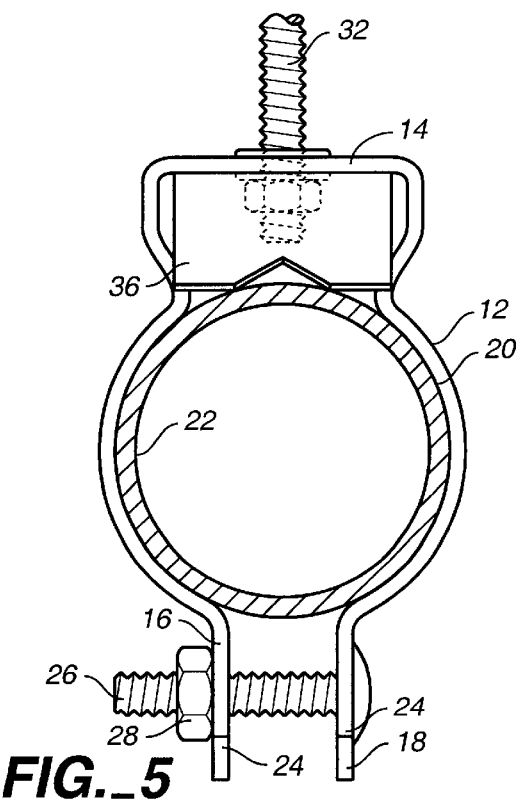
FIG._5
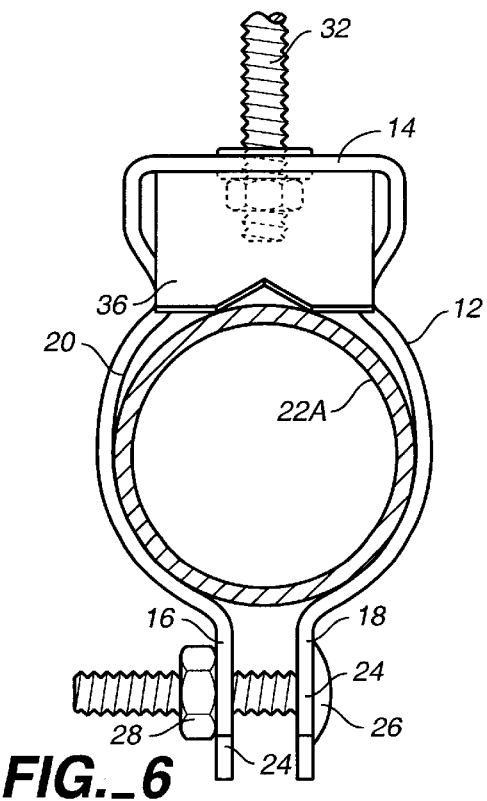
FIG._6

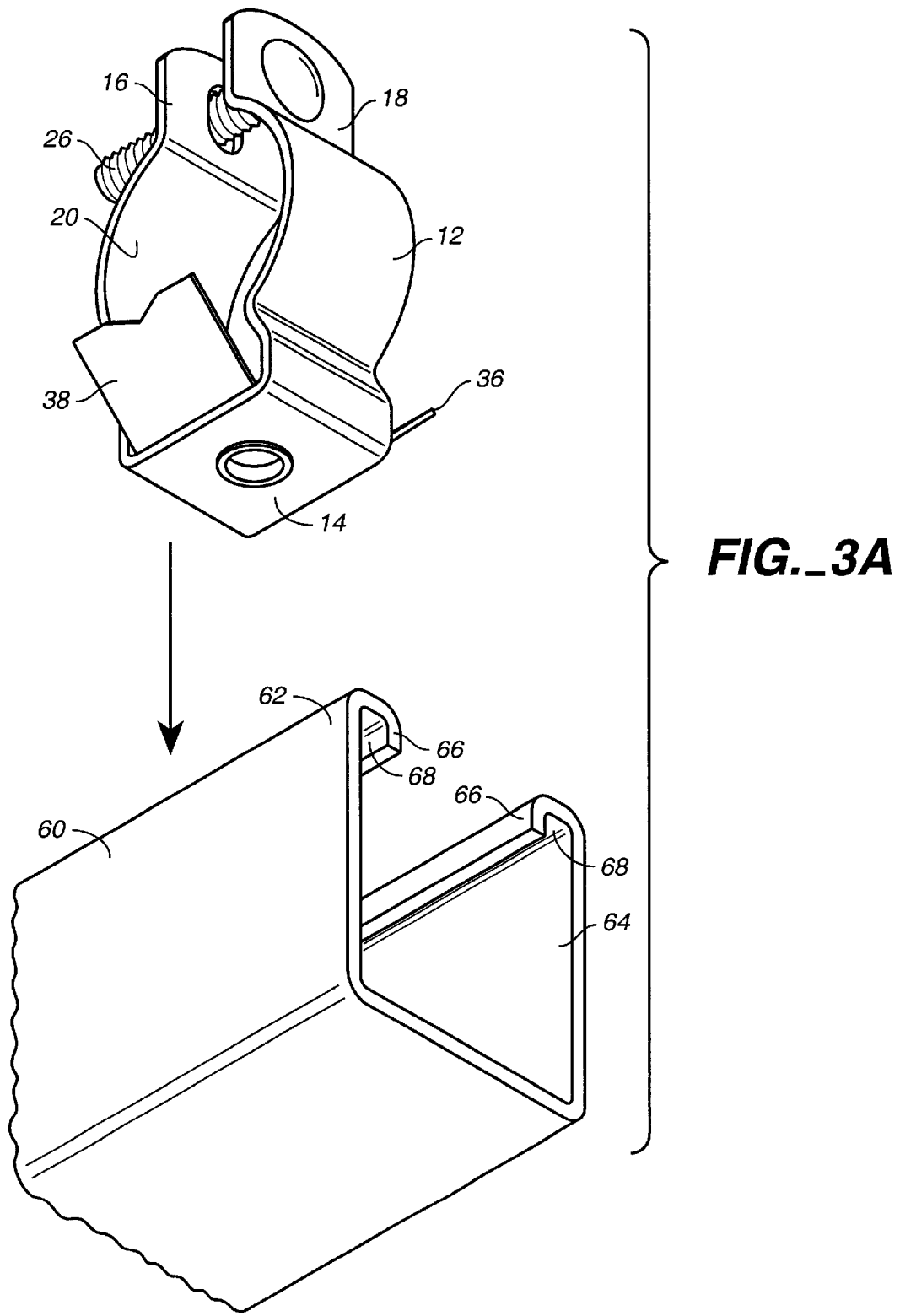
FIG._3A

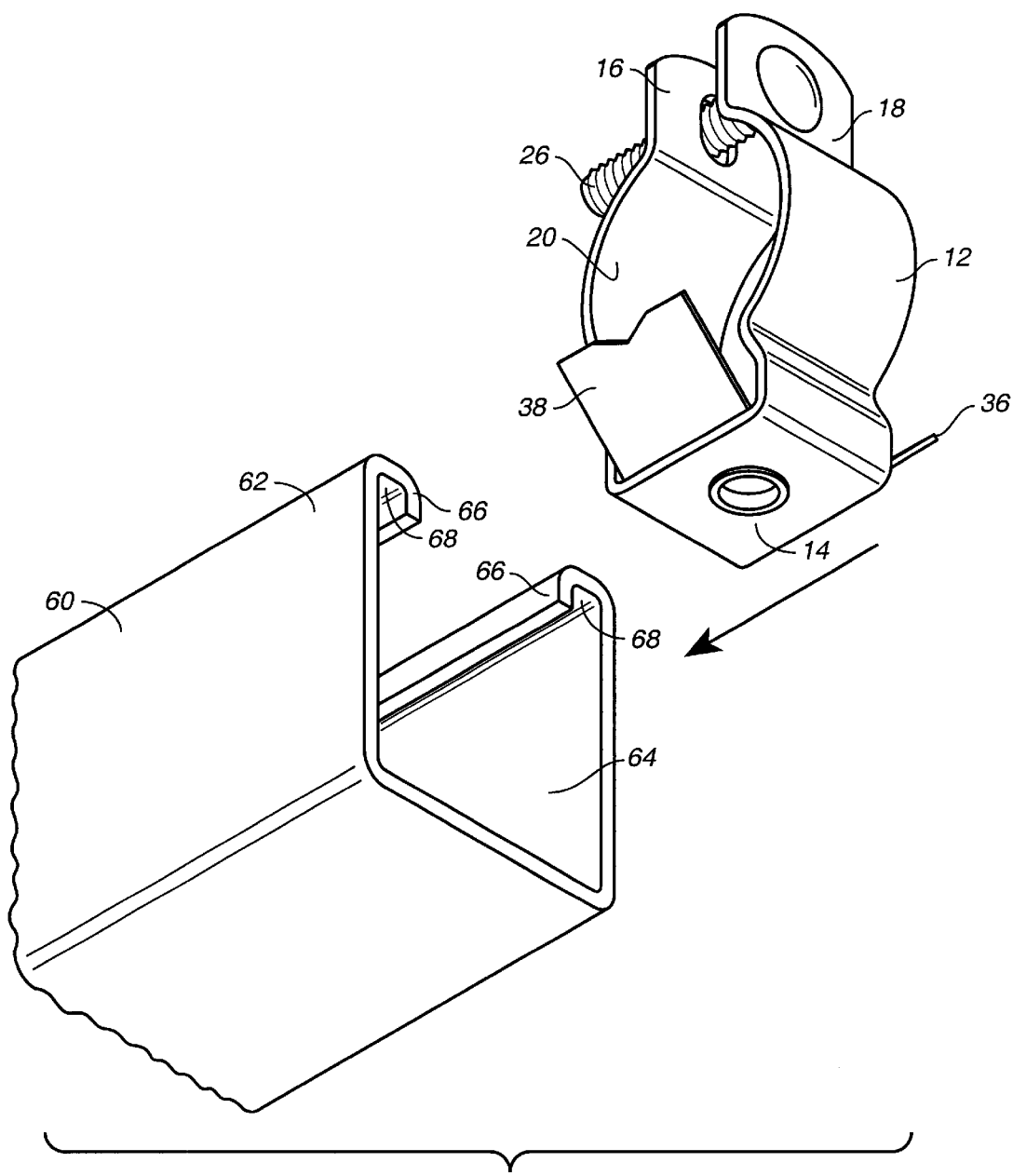
FIG._3B

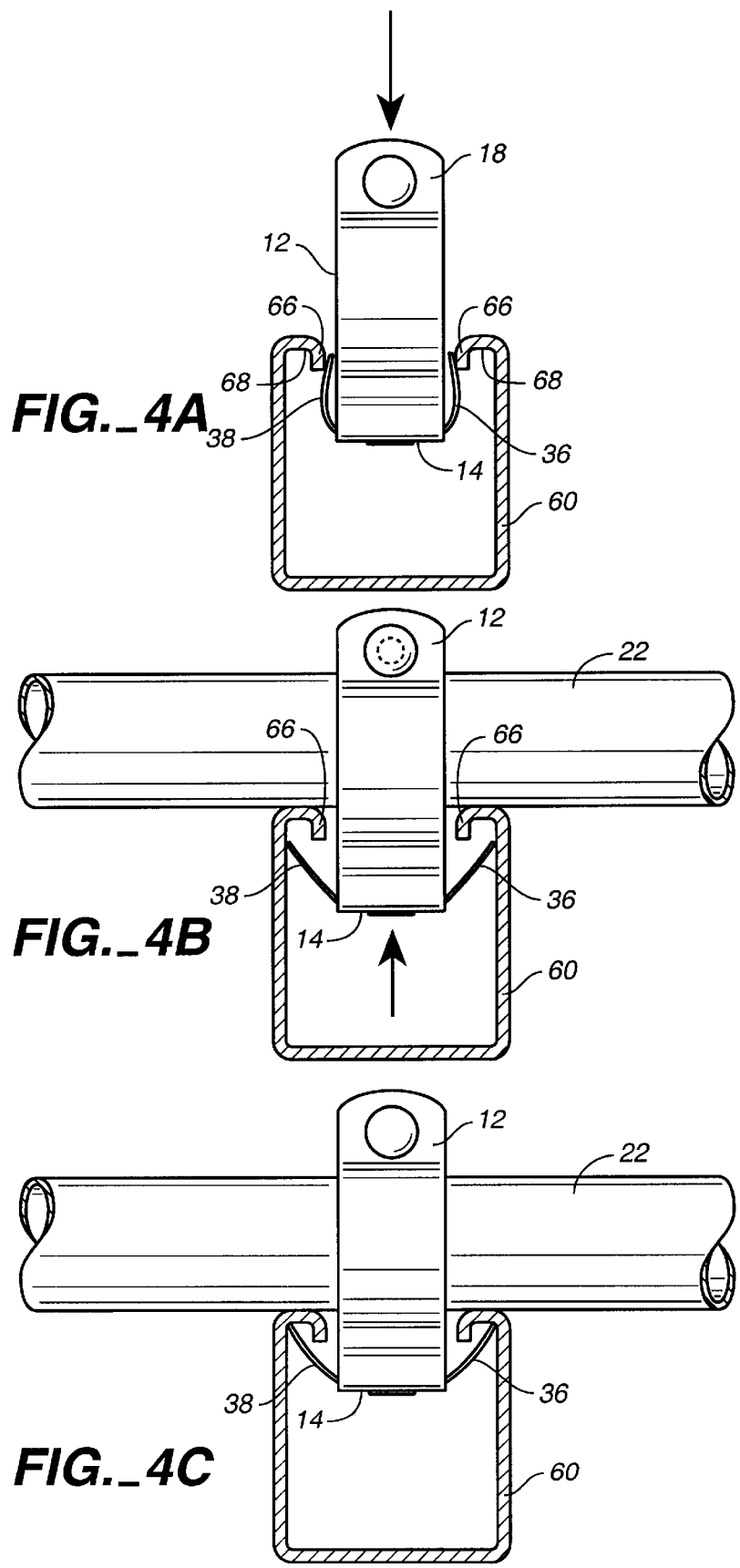

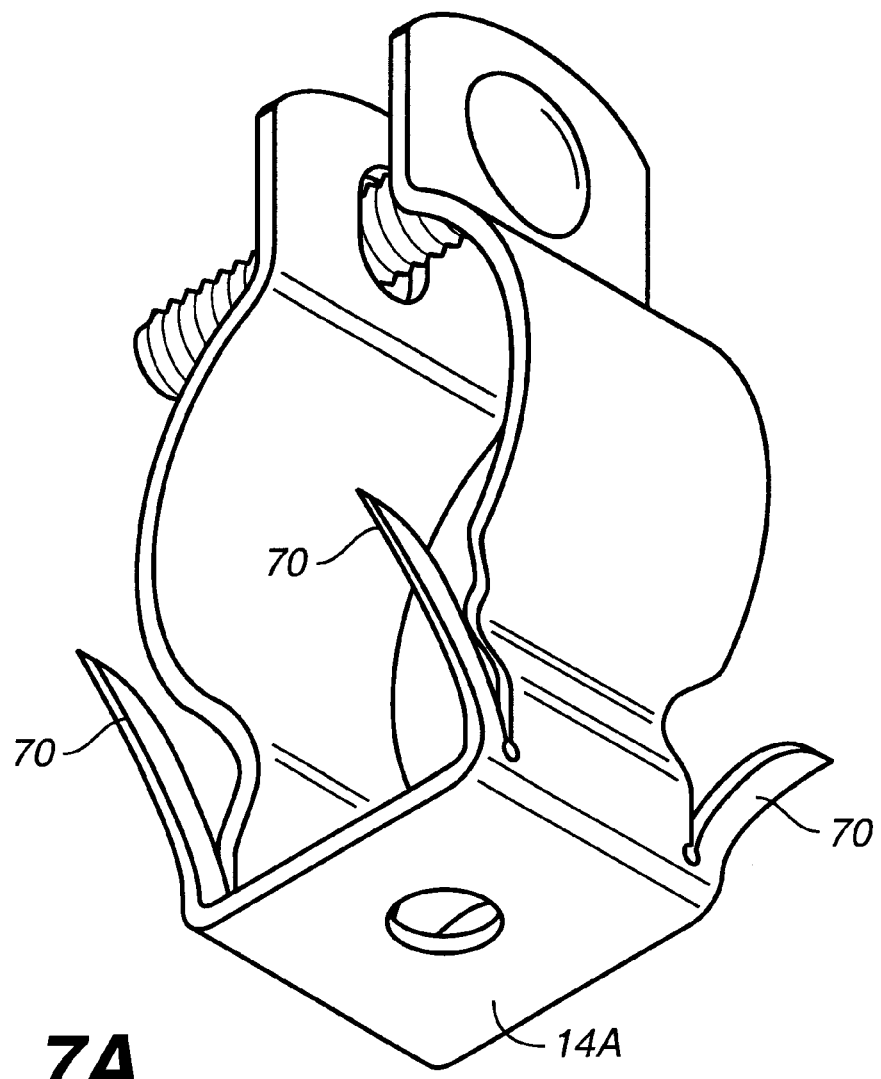
FIG._7A

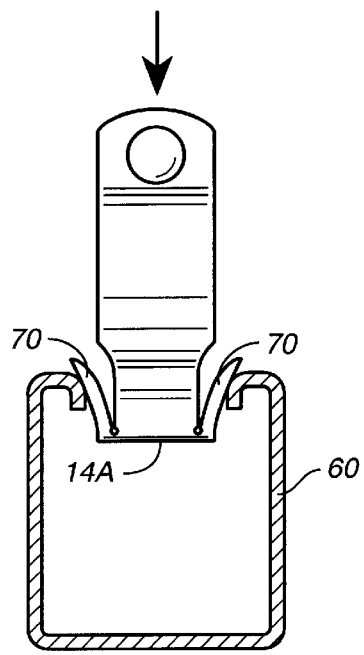
FIG._7B
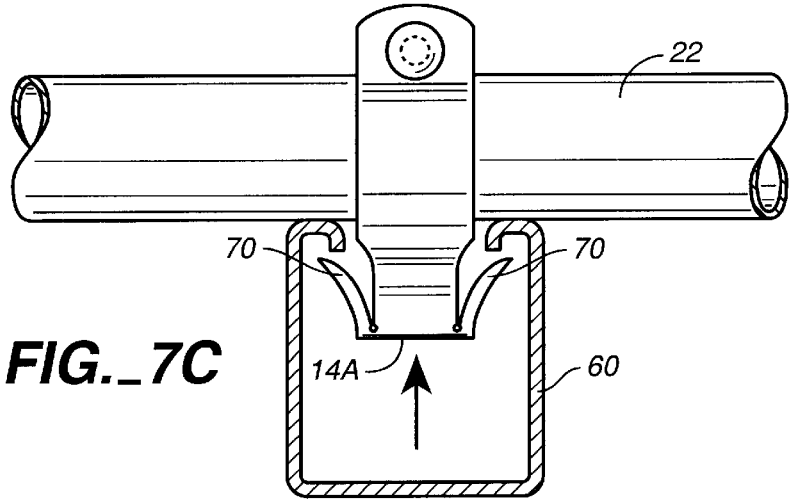
FIG._7C
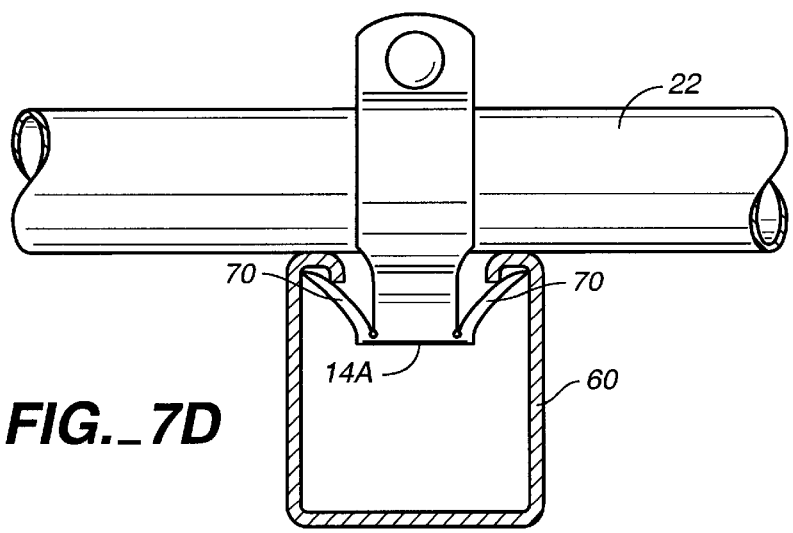
FIG._7D

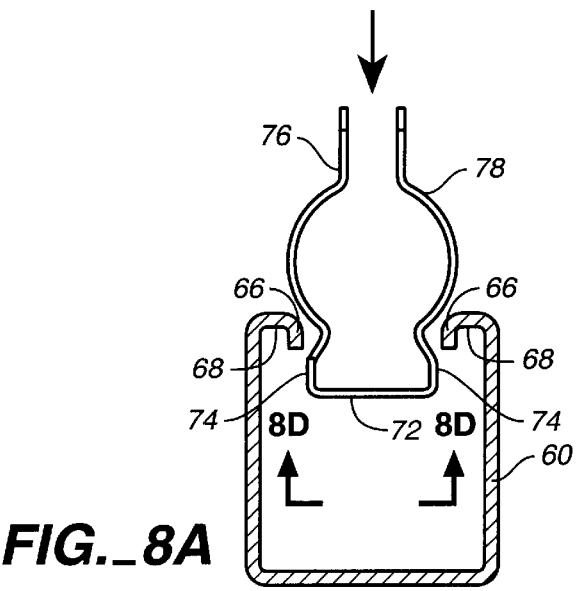
FIG._8A
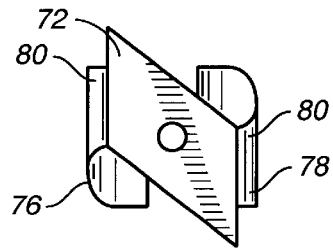
FIG._8D
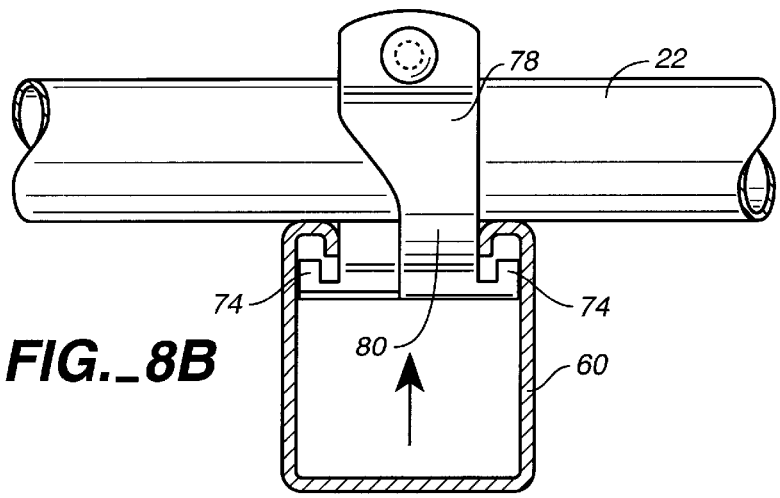
FIG._8B
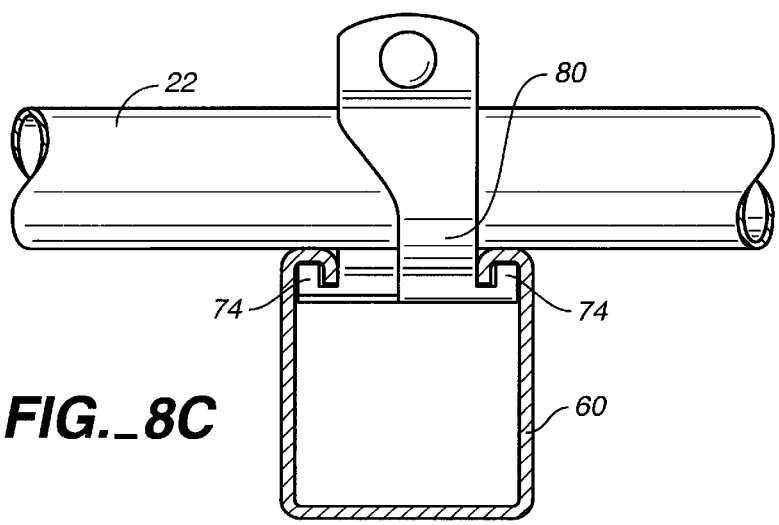
FIG._8C

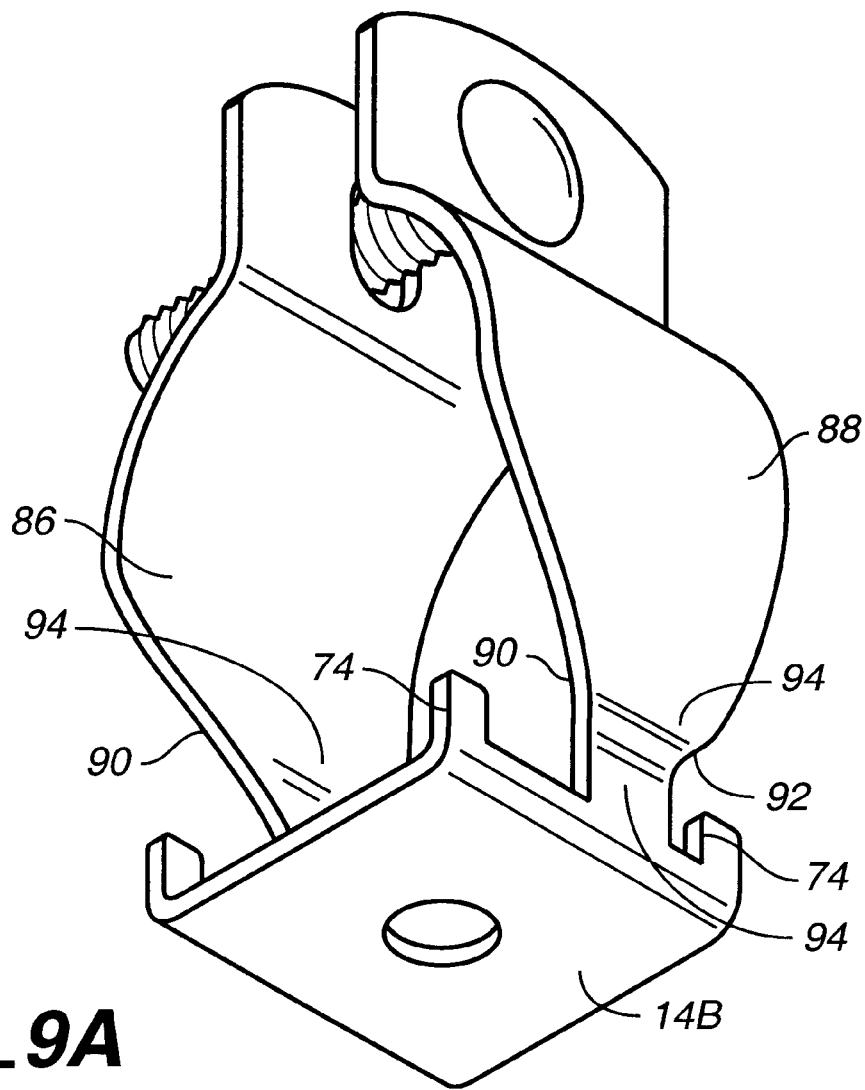
FIG._9A

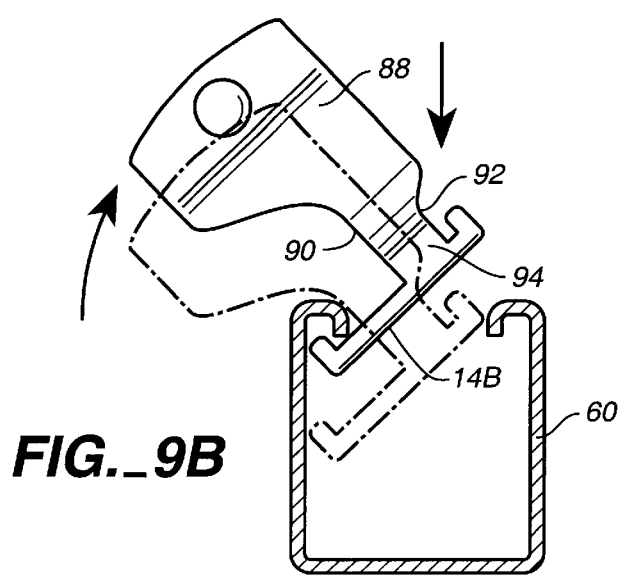
FIG._9B
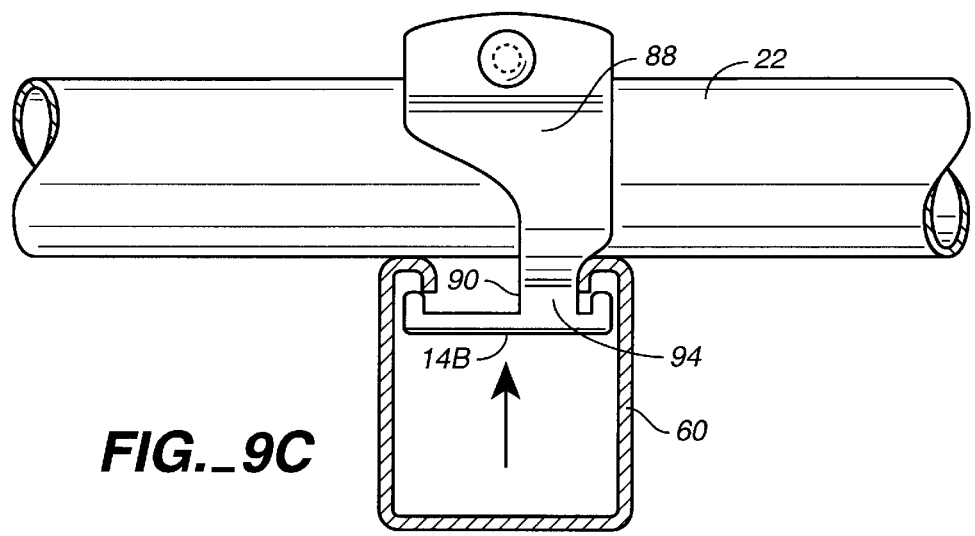
FIG._9C
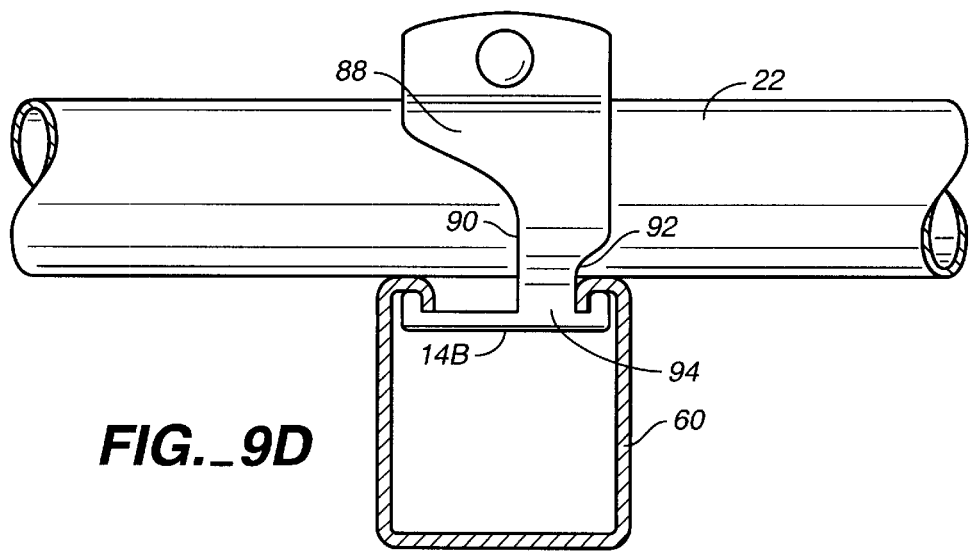
FIG._9D

HANGER SYSTEM FOR CONDUITS AND CHANNEL MEMBERS

TECHNICAL FIELD

This invention relates to hangers for conduits. The hanger can be utilized both as a hanger for a single conduit or to support a channel member which may be employed as a conduit trapeze support.

BACKGROUND OF THE INVENTION

There are two primary ways of hanging conduits in a building structure. The conduit or pipe can be supported directly by a hanger which is attached to a threaded hanger rod projecting downwardly from the ceiling. The hanger or bracket is usually sized for a specific size of conduit; thus, a contractor must make certain that a number of specific sizes of brackets or hangers are available for a specific job.

There are many types of conduit hangers or brackets of this general type, one of the most common being exemplified by the standard conduit hanger illustrated on page 16 of the July, 1996 edition of the Minerallac Company Product Guide.

Hangers of this general type have also been associated with beam clamps, rather than support rods, which secure the hanger to a beam. Devices of this type are shown on pages 18 and 19 of the July, 1996 edition of the Minerallac Company Spring Steel Fasteners Catalog. Pages 57–82 of the 1999 ERICO, INC. Caddy Fasteners Catalog illustrate a wide variety of conduit hanger devices.

In addition to supporting conduit directly by the brackets or hangers themselves, it is known to employ a channel member or other elongated member as a trapeze supported by a plurality of hangers, typically from hangers supported by threaded rods. The supported trapeze can then be utilized to support a plurality of conduits extending at right angles to the trapeze. The hangers employed to support a trapeze differ in structure from those employed to directly support a conduit, imposing on the builder yet another obligation to have a variety of types and sizes of specialty hangers and other parts on hand. The Erico Catalog pages referenced above disclose typical prior art trapeze installations.

DISCLOSURE OF INVENTION

The present invention relates to hanger apparatus that can be utilized to hold a conduit and also a trapeze. A single size of the hanger apparatus can be used in connection with a wide range of conduit sizes. The hanger apparatus also serves to restrain the conduit against movement in all directions. The term "conduit" as employed herein is broadly construed to encompass all forms of conduits, pipes and the like.

The hanger apparatus can be directly attached to a threaded hanger rod to support a conduit. In another orientation the hanger apparatus engages a channel member utilized as a trapeze to support the channel member.

The hanger apparatus is also characterized by its relative simplicity and ease of use. When installed, a very stable support is provided, whether the supported object be a conduit or a channel member.

The hanger apparatus incorporates a hanger member including a hanger member base, two hanger member legs extending from the hanger member base and defining a void therebetween for receiving a conduit and a mechanical fastener extending between and connecting the hanger member legs for securing the conduit hanger about a conduit located in a void defined by the hanger member legs.

The hanger apparatus additionally includes retainer means comprising a plurality of spaced projections attached to the hanger member base. The projections project from the hanger member base in the general direction of the spaced hanger member leg distal ends and have spaced projection distal ends positioned away from the hanger member base and the hanger member legs.

The projection distal ends are for selective alternate engagement either with a conduit located in the void to resist relative movement between the hanger member and the conduit or with a channel member to secure the hanger member and a conduit located in the void to the channel member.

Other features, advantages, and objects of the present invention will become apparent with reference to the following description and accompanying drawings.

BRIEF DESCRIPTION OF DRAWINGS

FIG. 1A is a perspective view of hanger apparatus constructed in accordance with the teachings of the present invention attached to a conduit;

FIG. 1B is an enlarged, perspective view of the hanger apparatus;

FIG. 2A is a greatly enlarged, cross-sectional view taken along the line 2A—2A in FIG. 1B;

FIGS. 2B and 2C are views similar to FIG. 2A, but illustrating different embodiments;

FIG. 3A is a perspective view of the hanger apparatus of FIG. 1A inverted and being applied to a channel member;

FIG. 3B is a view similar to FIG. 3A but illustrating the hanger apparatus being applied to the channel member from the end of the channel member, rather than from the top thereof as shown in FIG. 3A;

FIGS. 4A–4C are views illustrating a channel member in cross-section having the hanger apparatus of FIG. 1A applied thereto in the manner illustrated in FIG. 3A, FIGS. 4A–4C illustrating sequential steps carried out in the process, and FIGS. 4B and 4C showing a conduit in association with the hanger apparatus and the channel member;

FIGS. 5 and 6 illustrate the hanger apparatus of FIG. 1A connected to conduits of different sizes;

FIG. 7A is a perspective view of an alternative embodiment of the hanger apparatus;

FIGS. 7B–7D are views similar to FIGS. 4A–4C but illustrating sequential steps carried out when applying the embodiment of FIG. 7A to a conduit and channel member;

FIG. 8A is a perspective view illustrating another alternate embodiment of the hanger apparatus;

FIGS. 8B–8D are views similar to FIGS. 4A–4C but illustrating the embodiment of FIG. 8A being installed on a conduit and channel member;

FIG. 9A is a perspective view showing still another alternate embodiment of the hanger apparatus; and FIGS. 9B–9D show sequential steps employed when connecting the embodiment of FIG. 9A to a channel member and conduit.

MODES FOR CARRYING OUT THE INVENTION

FIGS. 1A, 1B, 2A, 3A, 3B, 4A–4C, 5 and 6 disclose a preferred form of the hanger apparatus of the present invention. The hanger apparatus includes a hanger member 12 having a rectangular shaped hanger base 14. Integrally connected to the base 14 and extending downwardly therefrom from two opposed sides of the base are hanger member legs 16, 18. The hanger member legs 16, 18 define a void 20 therebetween which receives a conduit 22.

The hanger member legs have spaced hanger member legs distal ends 24. Holes are formed at the distal ends and a mechanical fastener in the form of a bolt 26 passes therethrough, the head of the bolt 26 and a nut 28 threadedly engaged therewith disposed at the outer surfaces of the distal ends, as perhaps may best be seen with reference to FIGS. 5 and 6. An aperture 30 is formed in the base 14 for receiving a threaded hanger rod 32 (see FIGS. 1A, 5 and 6) which is used to support the hanger member and the conduit 22,in a conventional fashion. In fact, the hanger member 12 described above is of conventional construction.

What is unique about the hanger apparatus being described is retainer means employed in combination with the hanger member. In the embodiment under discussion the retainer means is in the form of spaced projections 36, 38 which are attached to the hanger member base 14 by a rivet 40 passing through a central portion 46 integrally connected to projections 36, 38. The projections 36, 38 comprise outwardly diverging, flexible, resilient plates formed of spring steel or the like.

The projections 36, 38 project from the hanger member base in the general direction of the spaced hanger member leg distal ends. The projections project from sides of the base orthogonally disposed relative to the sides from which hanger member legs extend.

A notch 42 is defined by the distal end of each projection. The notches 42 receive conduit 22.

An important aspect of the hanger apparatus is its ability to accommodate different sized conduits without changing the size of the hanger apparatus itself. FIG. 5 shows conduit 22 disposed in the void defined by the hanger member legs. FIG. 6 shows the same hanger apparatus being employed to hold a conduit 22A which is smaller than conduit 22. The notched distal ends of the flexible, resilient projections always remain in contact with the conduit, regardless of the size of the conduit. In FIG. 5 the distal ends of the legs are further apart than the distal legs in FIG. 6 wherein smaller conduit 22A is accommodated by the hanger member. This, of course, is simply a function of how far the nut 28 is from the bolt head. In both cases the distal ends of the projections 36, 38 engage the conduit retained by the hanger apparatus and relative movement between the hanger apparatus and the conduit is restricted or restrained in all directions. Depending upon the hardness of the materials from which the projections and conduits are constructed, the distal ends of the projections can actually "bite" into the conduit to positively prevent movement of the hanger apparatus lengthwise along the conduit after the conduit has been secured in place. Tightening of the bolt and nut serves to raise the conduit relative to the projections 36, 38 so that such restraint always exists.

FIG. 2B shows an alternative form of attachment between the hanger member base and the projections. In this instance the. projections are spot welded, as at 44 to the base. As is the case with the first embodiment, the projections 36, 38 are integrally connected by a flat center portion 46.

FIG. 2C illustrates an embodiment wherein the projections 48, 50 are actually integrally formed with the hanger member base 14.

As indicated above, the hanger apparatus can be employed to support a channel member that is used as a trapeze, for example. FIGS. 3A, 3B and 4A 40 illustrate a channel. member 60 of conventional construction. The channel member is open at the top and includes two opposed, spaced channel member walls 62, 64 which define a channel member interior open at the top. The walls 62, 64 form opposed, spaced elongated lips 66. Each lip 66 defines an elongated indent 68 which communicates with the channel member interior. The channel member just described is of conventional construction.

To connect the channel member to the hanger apparatus the hanger apparatus is inverted so that the base 14 thereof is disposed downwardly. This is shown in FIG. 3A and also in FIG. 4A. FIG. 4A shows the hanger member base pushed down into the interior of the channel member, as shown by the arrow, the projections 36, 38 flexing inwardly under pressure to allow passage of the hanger apparatus between the elongated lips 66.

FIG. 4B shows the projections 36, 38 within the interior of the channel member, the projections 36, 38 having flexed outwardly so that the distal ends thereof are disposed under lips 66. FIG. 4B shows a conduit 22 positioned in the void defined by the hanger member legs 16, 18. Tightening of the bolt and nut will cause the legs to cooperate with the conduit to cam the hanger member in an upward direction as indicated by the arrow in FIG. 4B. The nut and bolt are tightened until the distal ends of the projections 36, 38 engage the undersides of lips 66 and are located in the elongated indents 68 as shown in FIG. 4C. This will enable the hanger apparatus to support the channel member.

Rather than insert the base and projections through the upper opening of the channel member, the hanger apparatus can be placed in position relative to the channel member by inserting the hanger apparatus into the channel member through a channel member open end. This is shown in FIG. 3B. After insertion the nut and bolt are tightened to bring the distal ends of the projections 36, 38 into engagement with the undersides of lips 66 as previously described.

FIGS. 7A–7D illustrate another form of the invention wherein a resilient, flexible prong element 70 having a pointed prong element end is located at each of the four corners of the hanger member base 14A. The prong elements are integral with the base and flare outwardly from opposed sides thereof. FIGS. 7B–7D illustrate installation of the hanger apparatus of this embodiment on a channel member 60 and conduit 22. Essentially, the process is the same as that described above with respect to the embodiment illustrated in FIGS. 4A–4C.

FIGS. 8A–8D show another form of hanger apparatus constructed in accordance with the teachings of the present invention. In this embodiment, the hanger member base 72 is in the shape of a parallelogram having two opposed obtuse angles and two opposed acute angles. Projections in the form of rigid tabs 74 are located at opposed corners of the hanger member base.

The hanger member legs 76, 78 of the hanger member are of reduced width immediately adjacent to the hanger member base 72. Each of the hanger member legs 76, 78 includes a hanger member leg portion 80 of reduced width. The leg portions 80 are offset with respect to the hanger member base whereby the hanger member leg portion is closer to one rigid tab than to the other of the other rigid tabs.

FIGS. 8A–8D show the steps employed when attaching the hanger apparatus of this embodiment to a channel member 60. First, the base of the hanger member is oriented so that it can be passed through the open top of the channel member as shown by FIG. 8A. Next, the hanger member is turned ninety degrees so that the tabs 74 are positioned under the elongated indents 68 of lips 66. Next, the bolt and nut of the hanger member are tightened to draw the tabs into the elongated indents as shown in FIG. 8C, the engaging surfaces of conduit 22 and legs 76, 78 cooperating to draw the hanger member upwardly.

FIGS. 9A–9D show still another form of hanger apparatus. In this embodiment, each of the hanger member legs 86, 88 defines a pair of opposed indents 90, 92 and includes a hanger member leg portion 94 offset with respect to the hanger member base 14B whereby the hanger member leg portion 94 is closer to one rigid tab 74 than to the other of the rigid tabs.

There are four tabs 74, one tab being located at each of the corners of the hanger member base. FIGS. 9B–9D illustrate the sequential steps employed to attach the channel member 60 and conduit 22 to this embodiment of the hanger member, FIG. 9B showing two positions of the hanger member, one in solid line and one in phantom.

The invention claimed is:

1. Hanger apparatus comprising, in combination:
 a hanger member including a hanger member base having two pairs of opposed base sides, two hanger member legs integrally attached to said hanger member base at one of said pairs of opposed base sides extending from said hanger member base and defining a void therebetween for receiving a conduit, said hanger member legs having spaced hanger member leg distal ends, and a mechanical fastener extending between and connecting said hanger member legs adjacent to said hanger member leg distal ends for securing said conduit hanger about a conduit located in said void; and
 retainer means comprising a plurality of spaced projections attached to said hanger member base, said projections projecting from said hanger member base in the general direction of the spaced hanger member leg distal ends and having spaced projection distal ends positioned away from said hanger member base and said hanger member legs, said projection distal ends for selective alternate engagement either with a conduit located in said void to resist relative movement between said hanger member and said conduit or with a channel member to secure said hanger member and a conduit located in said void to said channel member, said projections comprising two outwardly diverging, flexible plates affixed to said hanger member base and extending from the other of the pairs of opposed base sides, said projection distal ends being unrestrained against movement and defining notches for receiving a conduit located in said void, said projection distal ends engageable with the conduit at said notches to resist relative movement between said conduit and said hanger apparatus.

2. In combination:
 an elongated channel member defining a channel member interior and including two opposed, spaced channel member walls having distal ends forming opposed, spaced, elongated, inwardly projecting lips, each said lip turning inwardly toward said channel member interior and defining an elongated indent communicating with said channel member interior;
 a hanger member including a hanger member base disposed in said channel member interior having two pairs of opposed base sides and including corners, two hanger member legs integrally attached to said hanger member base at one of said pairs of opposed base sides, said hanger member legs disposed substantially orthogonal to said hanger member base extending away from said hanger member base and extending outwardly from said channel member interior, said hanger member legs having leg distal ends and each hanger member leg having a curved portion adjacent to the distal leg end thereof, said curved portions of said hanger member legs defining a void;
 a mechanical fastener extending through said hanger member legs at locations between said distal leg ends and the curved portions of said hanger member legs interconnecting said hanger member legs externally of said channel member;
 projections attached to said hanger member base and projecting away from the hanger member base from at least one pair of opposed base sides, said projections comprising tabs located at opposed corners of said hanger member base, a tab being located at each of the corners of said hanger member base; and
 a conduit within the void defined by the curved portions of said hanger member legs, said mechanical fastener upon tightening thereof operable to pull said hanger member legs together whereby the curved portions cooperate to cam the hanger member in a direction away from the channel member whereby said projections are pulled into said elongated indents and engage said inwardly turned lips to resist relative movement between said conduit and said hanger apparatus, each of said hanger member legs defining a pair of opposed indents and including a hanger member leg portion of reduced width located between said, opposed indents, said hanger member leg portion being offset with respect to said hanger member base whereby the hanger member leg portion is closer to one tab than to the other of said tabs.

3. Hanger apparatus comprising, in combination:
 a hanger member including a hanger member base, two hanger member legs extending from said hanger member base and defining a void therebetween for receiving a conduit, said hanger member legs having spaced hanger member leg distal ends, and a mechanical fastener extending between and connecting said hanger member legs for securing said conduit hanger about a conduit located in said void; and
 retainer means comprising a plurality of spaced projections attached to said hanger member base, said projections projecting from said hanger member base in the general direction of the spaced hanger member leg distal ends and having spaced projection distal ends positioned away from said hanger member base and said hanger member legs, said projection distal ends for selective engagement with a channel member to secure said hanger member and a conduit located in said void to said channel member, said hanger member base including corners, said projections comprising tabs located at said corners, each of said hanger member legs defining a pair of opposed indents and including a hanger member leg portion of reduced width located between said opposed indents, said hanger member leg portion being offset with respect to said hanger member base whereby the hanger member leg portion is closer to one tab than to other of said tabs.

4. Hanger apparatus comprising, in combination:
 a hanger member including a hanger member base, two hanger member legs extending from said hanger member base and defining a void therebetween for receiving a conduit, said hanger member legs having spaced hanger member leg distal ends, and a mechanical fastener extending between and connecting said hanger member legs for securing said conduit hanger about a conduit located in said void; and retainer means comprising a plurality of spaced projections attached to said hanger member base, said projections projecting from said hanger member base in the general direction of the spaced hanger member leg distal ends and having spaced projection distal ends positioned away from said hanger member base and said hanger member legs, said projection distal ends for selective engagement with a channel member to secure said hanger member and a conduit located in said void to said channel member, said hanger member base including corners, said projections comprising tabs located at said corners, each of said hanger member legs defining at least one indent forming a hanger member leg portion of reduced width, said hanger member leg portion being offset with respect to said hanger member base whereby the hanger member leg portion is closer to one tab than to other of said tabs.

* * * * *